United States Patent [19]
Atterbury et al.

[11] Patent Number: 5,473,910
[45] Date of Patent: Dec. 12, 1995

[54] APPARATUS AND METHOD FOR EXHAUST GAS DISPERSION AND CONDENSATE REMOVAL FOR GAS ENGINE DRIVEN HEAT PUMPS

[75] Inventors: William G. Atterbury, Columbus; Scott N. Danhof, Plain City, both of Ohio

[73] Assignee: Gas Research Institute, Chicago, Ill.

[21] Appl. No.: 123,790

[22] Filed: Sep. 20, 1993

[51] Int. Cl.⁶ .................................................... F25B 27/02
[52] U.S. Cl. ............................................ 62/323.1; 62/272
[58] Field of Search .............................. 62/323.1, 238.7, 62/272, 285, 296, 85, 338.6, 324.1

[56] References Cited

U.S. PATENT DOCUMENTS

| | | | |
|---|---|---|---|
| 3,139,924 | 7/1964 | Schreiner | 62/323.1 |
| 3,426,526 | 2/1969 | Tornmarck | 60/30 |
| 3,748,830 | 7/1973 | Ross et al. | 55/89 |
| 3,782,115 | 1/1974 | Johnson | 60/274 |
| 3,831,377 | 8/1974 | Morin | 60/274 |
| 4,592,208 | 6/1986 | Sollner et al. | 62/323.1 |
| 4,656,831 | 4/1987 | Budininkas et al. | 60/297 |
| 4,792,014 | 12/1988 | Shin-Seng | 181/280 |
| 5,003,788 | 4/1991 | Fischer | 62/238.7 |
| 5,007,238 | 4/1991 | Seko | 60/309 |
| 5,020,320 | 6/1991 | Talbert et al. | 62/238.7 |
| 5,135,723 | 8/1992 | Fuller | 422/184 |
| 5,351,487 | 10/1994 | Abdelmalek | 60/618 |

*Primary Examiner*—Henry A. Bennett
*Assistant Examiner*—William C. Doerrler
*Attorney, Agent, or Firm*—Dick and Harris

[57] ABSTRACT

A gas engine driven heat pump system including an apparatus and method for exhaust gas dispersion and condensate removal which disperses and mixes exhaust gases more effectively to prevent local icing, inhibit frosting of outdoor heat exchangers, reduce engine noise, and mask exhaust odors, and which removes and treats condensate to further inhibit frosting and corrosion. Dispersion and condensate removal are achieved with exhaust gas distribution and condensate draining features incorporated into the exhaust system of the present invention, and with a fan compartment structure which promotes more complete mixing of exhaust gases and ambient air, while housing both the exhaust system and the outdoor heat exchanger.

20 Claims, 2 Drawing Sheets

APPARATUS AND METHOD FOR EXHAUST
GAS DISPERSION AND CONDENSATE
REMOVAL FOR GAS ENGINE DRIVEN
HEAT PUMPS

BACKGROUND OF THE INVENTION

The present invention relates to the exhaust systems of gas engine driven heat pumps. In particular, the invention relates to an apparatus and method for the removal and treatment of corrosive condensate, and dispersion of remaining exhaust gases, produced in the exhaust streams of gas engine heat pumps.

It is well known that heat pump systems are selectively operable in heating and cooling modes of operation, respectively, to transfer heat into or remove heat from the living spaces of a building. In gas engine driven heat pump systems, an internal combustion engine prime mover produces refrigerant vapor compression, and selectively reversible refrigerant connections convey the refrigerant between an outdoor heat exchanger and indoor heat exchanger.

Ambient outside air has been used as the heat source in the heating or heat pumping mode, and as a heat sink for the cooling mode. In the heating mode, the outside heat exchanger is operating as an evaporator drawing heat from the ambient air heat source. During the heating mode, when the ambient air is at lower temperatures, i.e., near the freezing temperature of the moisture in the air, the problem of frozen condensate on the outdoor refrigerant heat exchanger becomes a serious one. As the moisture collects on the outside heat exchanger, the build up of frost acts as an insulator, reducing heat exchange at the outdoor heat exchanger surfaces, reducing system thermal efficiency, and reducing heat pumping effectiveness.

In some gas engine driven heat pump systems the engine exhaust is introduced into a fan compartment which includes the outdoor heat exchanger coil of the heat pump. Natural gas engines generate exhaust gas which contains water vapor, hydrocarbons, CO, $CO_2$, $NO_x$, and $SO_x$ as byproducts of combustion. Dispersion of the exhaust gas and even mixing with the airflow drawn through the outdoor coil is desirable from an aesthetic standpoint to disperse and mask the exhaust gas odor, and engine noise, and to dilute exhaust gas moisture. In the heating mode, the outdoor heat exchanger may also recover some heat from the engine exhaust.

However, the water vapor present in the exhaust stream can exacerbate the build up of frost on fan compartment and outdoor heat exchanger surfaces, reducing heat pump operating efficiency. Localized icing can result if the exhaust gases impinge directly on the fan motor, blade or fan compartment grille. Moreover, during various operating modes, under certain conditions the water vapor can condense and combine with the $NO_x$ and $SO_x$ to produce an acidic condensate. The acidic condensate consisting mainly of $HNO_3$ and $H_2SO_4$ accelerates corrosion on the exhaust system, the fan and fan compartment surfaces, and the outdoor heat exchanger. If drained from the fan compartment, the acidic condensate may have undesirable environmental effects, particularly on nearby vegetation.

One method of minimizing exhaust condensate is to insulate the exhaust hardware and maintain high exhaust temperature. However, such insulation adds to cost and size of the system. Further, the maintenance of high exhaust temperatures is incompatible with the use of an exhaust heat recuperator, which is preferred in the exhaust systems of gas engine driven heat pump systems to recover exhaust heat and improve overall heat pump system efficiency. The cooling of exhaust gases which results from use of a recuperator makes elimination of exhaust condensate under all operating conditions nearly impossible.

Accordingly, the need exists to provide for improved dispersion and mixing of engine exhaust gases, and proper removal and disposal of exhaust gas condensate, in order to reduce engine exhaust odor and noise, minimize icing, frosting and corrosion of the exhaust system, fan, fan compartment surfaces, and the outdoor heat exchanger, and to permit the use of desirable heat recovery features in gas engine driven heat pump systems.

SUMMARY OF THE INVENTION

The present invention satisfies those needs for gas engine driven heat pump systems by providing an apparatus and method for exhaust gas dispersion and condensate removal which disperses and mixes exhaust gases more effectively to prevent local icing, inhibit frosting, reduce noise, and mask exhaust odors, and which removes and treats condensate to further inhibit frosting and corrosion. Such dispersion and condensate removal are achieved in the present invention with various features incorporated into both the exhaust system and fan compartment which houses both the exhaust system and the outdoor heat exchanger.

In accordance with the present invention, a gas engine driven heat pump system is provided whose heat pump system components include an outdoor fan compartment defining a fan cavity and having a plurality of openings. A fan disposed in a first opening of the fan compartment produces an air stream through the fan compartment in at least one direction, and an outdoor heat exchanger positioned in a second opening conveys an air stream into or out of the fan compartment. A portion of the gas engine exhaust system is positioned in the fan compartment. That portion of the exhaust system includes at least one perforated distribution pipe having a plurality of openings to distribute engine exhaust in the fan compartment for dispersion, and at least one condensate drain opening. The perforated distribution pipe distributes and promotes exhaust gas dispersion more evenly throughout the fan cavity and more even mixing in the air stream, preventing local icing and frosting generally, as well as reducing exhaust noise and odor. The distribution pipe also urges condensed exhaust gases and vapors to drain from its condensate drain opening through a fan compartment drain opening, to the ground. In the preferred embodiment, the fan compartment drain opening is sized and positioned to further assist in promoting mixing of the exhaust gases.

Removal of condensable gases and vapors from the engine exhaust reduces corrosion on the exhaust system, the fan, fan compartment surfaces, and the outdoor heat exchanger. In accordance with the preferred embodiment of the present invention, the condensate is also chemically treated as it drains, reducing its acidity generally to benign levels. The preferred condensate treatment is an effective, low cost, passive chemical treatment of the condensate, such as a limestone bed positioned in a drain tube extending from the condensate drain opening. Condensate can thereby be treated to an environmentally acceptable level with substantially no impact on the cost, size or operation of the heat pump system.

The present invention also contemplates compact heat pump system design, which prefers placement of at least a portion of the engine exhaust system in the fan compartment. Such an arrangement is made possible in accordance with the present invention without the deleterious operational, aesthetic or environmental side effects which are drawbacks of prior art designs.

In a further aspect of the present invention, a method for exhaust gas dispersion and condensate removal is disclosed for gas engine driven heat pumps having heat pump system components including the features of the present invention described above. The preferred method includes the steps of distributing engine exhaust in the fan cavity through at least one perforated distribution pipe, and mixing the engine exhaust with the air stream produced by the fan in the fan compartment. The method next calls for draining condensed exhaust gases and vapors from the exhaust system and, preferably, chemically treating the condensate.

These and other objects, benefits and advantages of the present invention will be apparent from the drawings and detailed description which follows.

DETAILED DESCRIPTION OF THE PREFERRED EMBODIMENTS

Figure 1:
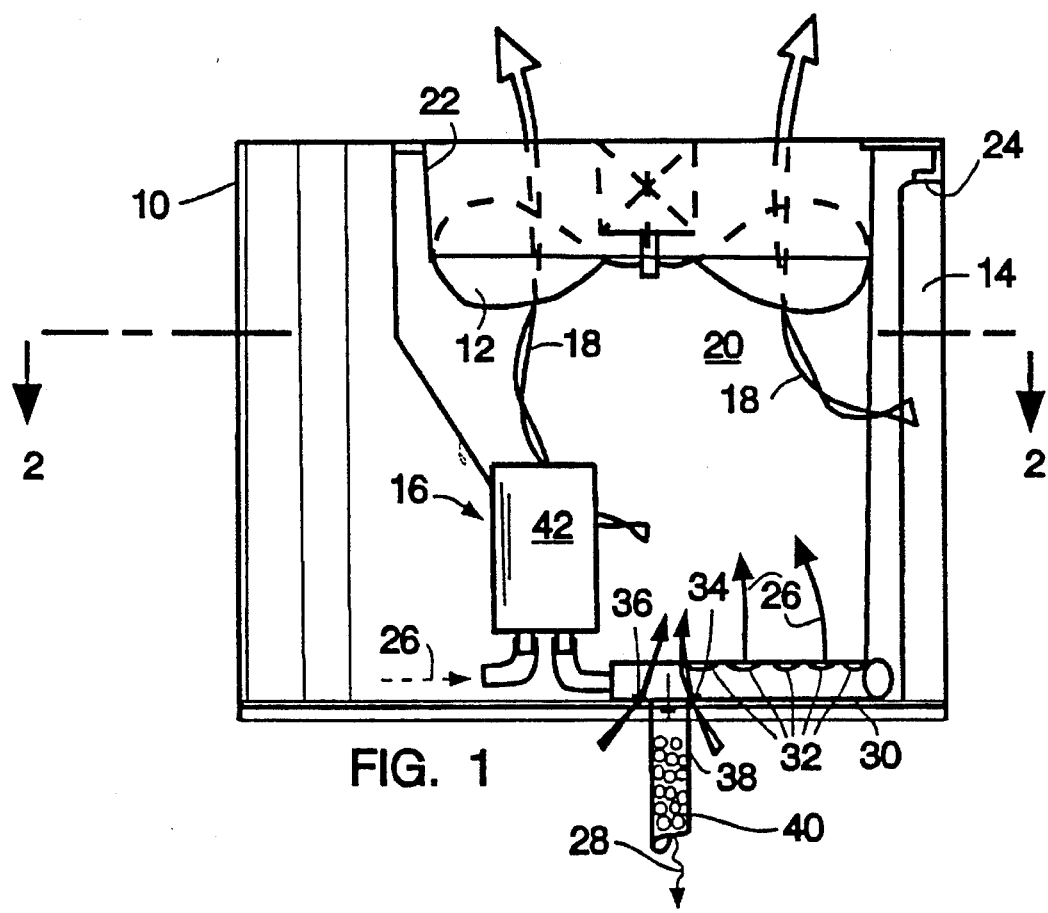
FIG. 1 is a schematic side elevational view of the preferred embodiment of the present invention.
Figure 2:
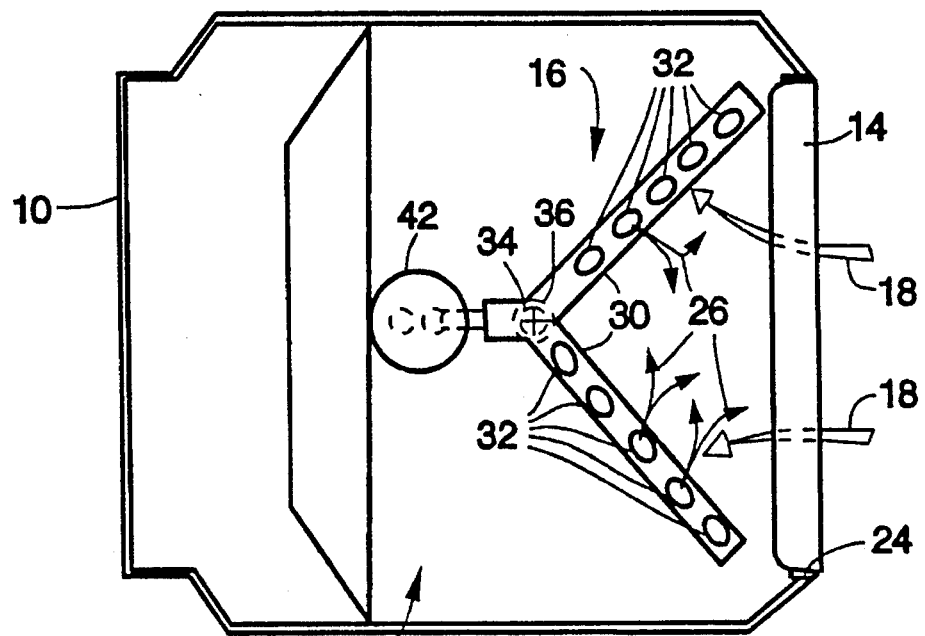
FIG. 2 is a schematic plan view of the preferred embodiment of the present invention shown in FIG. 1 taken along line 2—2.

Referring to FIGS. 1 and 2, gas engine driven heat pump system components including a fan compartment 10, fan 12, outdoor heat exchanger 14, and a portion of an exhaust system 16 are shown in accordance with the present invention. A representative gas engine heat pump system in which such components are useful in this arrangement is shown by Talbert et al., U.S. Pat. No. 5,020,321, issued Jun. 4, 1991, incorporated herein by reference in its entirety. In such systems, the heat pump system components provide heating to indoor spaces during heating mode operation. Preferably, as shown by Talbert et al., the heat pump system components are selectively operable in cooling or heating modes of operation, and are connected with cooling or heating loads and a heat sink or source to selectively provide heat to or remove heat from the load. In the heating mode, the outdoor heat exchanger 14 operates as an evaporator, drawing heat from the ambient air heat source, and in the cooling mode, operates as a condenser, providing heat to the ambient air heat sink. Further detailed discussion of heat pump system operation in various operating modes, set forth in detail by Talbert et al., is unnecessary to an understanding of the present invention.

As shown in FIGS. 1 and 2, the fan compartment 10 defines a fan cavity 20 and has a plurality of openings. The fan 12 is disposed in a first opening 22 of the fan compartment to produce an air stream 18 through the fan compartment in at least one direction. The direction of the air stream 18 through the outdoor heat exchanger 14 and the fan 12 is representatively shown in the desired direction. The outdoor heat exchanger 14 is positioned in a second opening 24 to convey an air stream 18 into the fan compartment.

In accordance with the present invention, a portion of the engine exhaust system 16 is positioned in the fan compartment 10 and serves to distribute and promote the dispersion and mixing of exhaust 26 in the fan cavity 20, while removing condensate 28 formed in the exhaust gas system 16. More specifically, that portion of the exhaust system 16 in the fan cavity 20 includes at least one perforated distribution pipe 30 having a plurality of openings 32 to distribute engine exhaust 26 in the fan compartment, and at least one condensate drain opening 34. The perforated distribution pipe 30 spreads the exhaust 26 more evenly throughout the fan cavity 20 for more even mixing in the air stream 18, preventing local icing and inhibiting frosting generally. Condensed exhaust gases and vapors from the exhaust system 16 drain from the distribution pipe 30 through the condensate drain opening 34 and fan compartment drain opening 36 to the ground.

Figure 3:
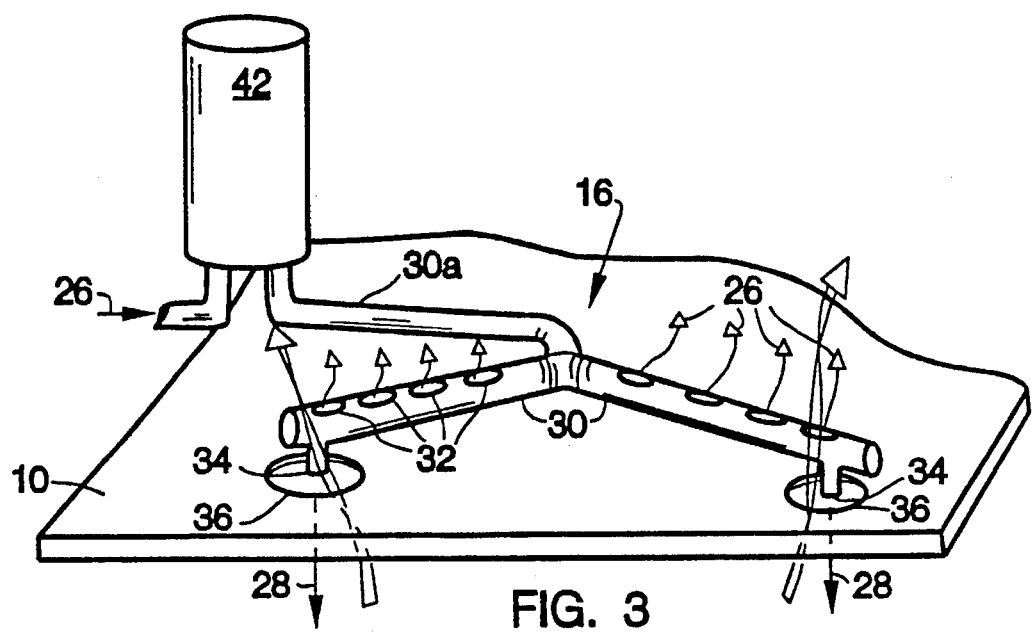
FIG. 3 is a partial schematic perspective view of an alternative configuration of FIG. 2.

Use of an exhaust heat recuperator 42 indicated in FIG. 1, is preferred in heat pump systems such as that shown by Talbert et al., to improve overall system efficiency. Such recuperators 42 recover waste heat from the engine exhaust 26 via heat exchange with a working fluid (not shown). Reduction in engine exhaust temperature with such devices produces condensate 28 under certain operating conditions. Fischer, U.S. Pat. No. 5,003,788, issued Apr. 2, 1991, is instructive as regards the use of such a recuperator in various operational modes of a heat pump system, and is incorporated herein by reference in its entirety. Alternatively, the recuperator 42 may be replaced with a muffler (not shown). Regardless, condensate removal from the engine exhaust 26 may also be assisted by the shape or length of the perforated distribution pipe 30. Pipe bends and curves, as well as knock out baffles (not shown) may be added for this purpose. Unperforated distribution pipe 30a lengths, as shown in FIG. 3 may also be added to provide additional cooling by the air streams 18 to promote condensation, prior to exhaust distribution in the perforated distribution pipe 30. More effective dispersion and mixing of exhaust 26 with air streams 18, and removal of condensate 28 from exhaust 26 facilitates use of desirable heat recovery elements, such as recuperator 42, while ameliorating undesirable side effects caused by cooler exhaust temperatures.

Still referring to FIG. 1, in accordance with the present invention, it is also preferred to include a drain tube 38 extending through the fan compartment drain opening 36 from the condensate drain opening 36 to receive the condensate 28. To further assist in promoting mixing of the engine exhaust 26, it is preferred to size the fan compartment drain opening 36 larger than the drain tube outer diameter to permit ambient air to flow around the drain tube 38 thereby drawing exhaust gas 26 into the fan cavity 20, and increasing turbulence within the fan compartment 10 without significantly short-circuiting ambient air flow through the outdoor heat exchanger 14.

The drain tube 38 also preferably includes a condensate treatment device to chemically treat the acidity of the condensate 28 to an environmentally benign level. In accordance with the present invention, as the condensate 28 drains, it is chemically treated, preferably with a simple, yet effective, low cost, low maintenance chemical device, such as a limestone bed 40 positioned in the drain tube 38 which extends from the condensate drain opening 34. As such, environmentally beneficial condensate treatment to an acceptable level is provided with substantially no impact on the cost, size or operation of the heat pump system.

Shown best in FIG. 2, the perforated distribution pipe 30 preferably includes at least two perforated distribution pipe sections which are connected to receive portions of the engine exhaust 26. The two pipe sections shown are connected to form an angle, and the condensate drain opening 34 is positioned generally near the vertex of the angle. The perforated distribution pipe 30 or pipe sections are also preferably disposed at an angle relative to horizontal to urge condensate 28 to flow towards the condensate drain opening 34. As also shown in FIG. 1, the perforated distribution pipe 30 is preferably disposed adjacent to the portion or panel of the fan compartment 10 which includes the fan compartment drain opening, and the fan compartment drain opening is preferably positioned and sized to promote exhaust gas 26 entrainment, mixing, and dispersion.

Referring now to FIG. 3, it is understood that alternative configurations of the perforated distribution pipe 30 are possible. As illustratively shown, the condensate drain openings 34 may be positioned generally near respective ends of the perforated distribution pipe sections, and two fan compartment drain openings 36 provided to facilitate draining from the fan compartment 10. The latter are, again, preferably sized and positioned to allow air to pass around drain tubes 38 and promote mixing. Because of the corrosive nature of the condensate 28, the condensate drain openings 34 are shown in the Figures aligned with the fan compartment drain openings 36. It is understood that a tube section could be used to route condensate to a fan compartment drain opening 36 which is not so aligned, but rather is positioned to maximize the mixing effect of air which enters therethrough.

Figure 4:
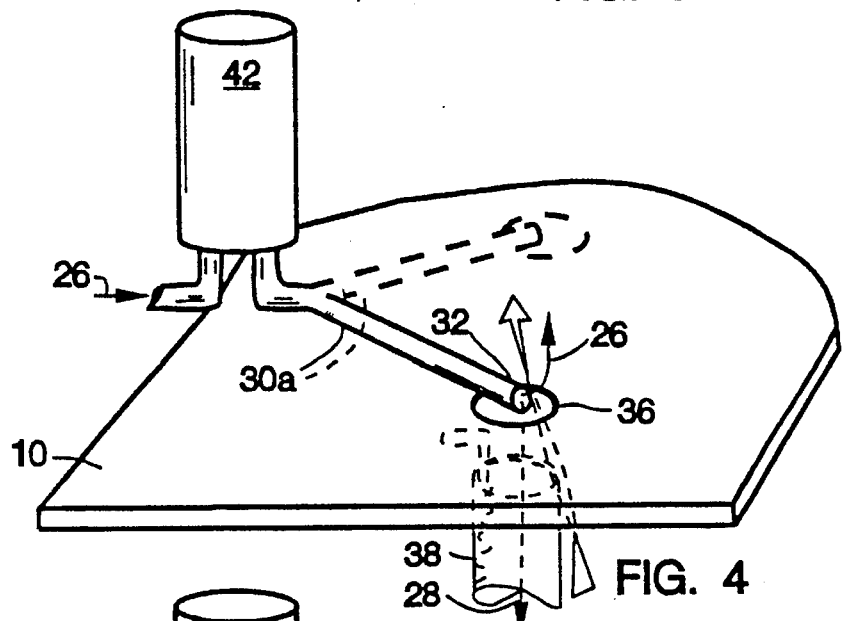
FIGS. 4 and 5 are partial schematic perspective views of an alternative embodiment of the present invention shown in various configurations.
Figure 5:
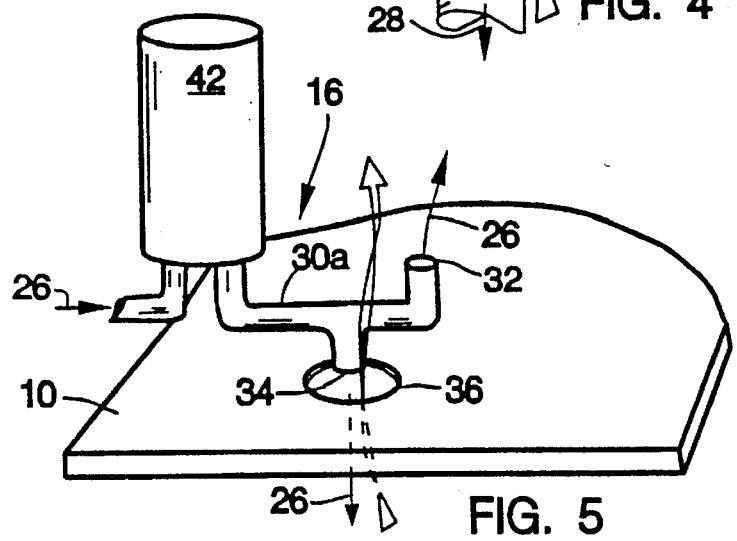

Referring now to FIGS. 4 and 5, in an alternative embodiment of the present invention, the portion of the exhaust system 16 positioned in the fan cavity 20 includes a distribution pipe 30a which has one opening 32, and thus may be essentially an unperforated pipe section. In accordance with the most basic design indicated in FIG. 4, the exhaust 26 and condensate 28 both emerge from the same opening 32, and the fan compartment drain opening 36 is positioned to promote mixing of the exhaust 26, while receiving the condensate 28 draining from the distribution pipe 30a. In this embodiment, the distribution pipe 30a is disposed generally adjacent to a portion of the fan compartment 10, as shown. As indicated in phantom in FIG. 4, more than one distribution pipe 30a may be provided. As further indicated, drain tube 38 may be connected in spaced relationship to the fan compartment 10 to receive and treat condensate 28, while allowing air flow into the fan cavity 20.

In the alternative embodiment of FIG. 5, the distribution pipe 30a includes at least one condensate drain opening 34 and at least one separate exhaust opening 32. A drain tube 38 (not shown) may again be attached to the fan compartment to receive condensate from the condensate drain opening 34 of the distribution pipe 30a. In the alternative embodiment, the drain openings 34, 36 may also be placed in various locations along the distribution pipe 30a, as in the preferred embodiment, where placement at different ends of the distribution pipe 30 are shown in FIGS. 1 and 3. Other features of the preferred embodiment may be further incorporated into the alternative embodiment of FIGS. 4 and 5. By way of example, without limitation, such features can be inclusion of a condensate treatment device, sizing of the fan compartment drain opening 36 to promote mixing, and disposing the distribution pipes 30a at angle.

Regardless of the embodiment, the present invention permits use of a compact heat pump system design which prefers placement of at least a portion of the engine exhaust system 16 in the fan compartment 10. Such an arrangement is made possible in accordance with the present invention with reduction in operational (icing, frosting and corrosion), aesthetic (noise and odor), and environmental side effects.

In a further aspect of the present invention, a method for exhaust gas dispersion and condensate removal for gas engine driven heat pumps is disclosed. The method includes first providing a gas engine driven heat pump system having heat pump system components as described above, including components in accordance with the apparatus of the present invention. The method then calls for the steps of distributing engine exhaust 26 in the fan cavity 20 through at least one, preferably perforated, distribution pipe 30, and mixing the engine exhaust 26 with the air stream 18 produced by the fan 12 in the fan compartment 10. The method next calls for draining condensed exhaust gases and vapors, i.e. condensate 28, from the exhaust system 16 through a condensate drain tube 38 which extends from the condensate drain opening 34 through the fan compartment drain opening 36. Preferably, the step of draining includes further chemically treating the condensate 28 in the drain tube.

While certain representative embodiments and details have been shown for purposes of illustrating the invention, it will be apparent to those skilled in the art that various changes in the apparatuses and methods disclosed herein may be made without departing from the scope of the invention, which is defined in the appended claims.

What is claimed is:

1. A gas engine driven heat pump system comprising heat pump system components to provide heating to indoor spaces during heating mode operation, said heat pump system including:

an outdoor fan compartment defining a fan cavity and having a plurality of openings;

a fan disposed in a first opening of said fan compartment to produce an air stream through said fan compartment in at least one direction;

an outdoor heat exchanger positioned in a second opening to convey an air stream into or out of said fan compartment;

at least a portion of the exhaust system of said gas engine positioned in said fan cavity to introduce engine exhaust thereinto and to provide exhaust gas dispersion and condensate removal, said portion of the exhaust system comprising:

at least one perforated distribution pipe having a plurality of openings to distribute engine exhaust in said fan compartment for dispersion;

at least one condensate drain opening in said distribution pipe to drain condensed exhaust gases and vapors from said exhaust system; and at least one fan compartment drain opening positioned generally to pass therethrough said condensate draining from said exhaust system.

2. The gas engine driven heat pump system of claim 1 wherein said perforated distribution pipe comprises at least two perforated distribution pipes connected to receive portions of the engine exhaust.

3. The gas engine driven heat pump system of claim 2 wherein:

said perforated distribution pipes are connected to generally form an angle therebetween; and said at least one condensate drain opening is positioned generally near the vertex of the angle formed by the perforated distribution pipes.

4. The gas engine driven heat pump system of claim 2 wherein said condensate drain opening comprises at least two condensate drain openings, each of which is positioned generally near a respective end of a said perforated distribution pipe.

5. The gas engine driven heat pump system of claim 1 wherein said at least one perforated distribution pipe is disposed at an angle relative to horizontal to urge condensate to flow towards said at least one condensate drain opening.

6. The gas engine driven heat pump system of claim 1 wherein:

said at least one condensate drain opening includes a drain tube extending through said fan compartment drain opening; and said fan compartment drain opening is larger than said drain tube diameter to permit air to flow around said drain tube into said fan cavity.

7. The gas engine driven heat pump system of claim 6 wherein said drain tube includes a condensate treatment device to chemically treat condensate.

8. The gas engine driven heat pump system of claim 7 wherein said condensate treatment device comprises a limestone bed disposed in said drain tube.

9. The gas engine driven heat pump system of claim 6 wherein said at least one perforated distribution pipe is disposed generally adjacent to that portion of said fan compartment which includes said fan compartment drain opening, and said fan compartment drain opening is positioned such that the air flow therethrough into said fan compartment promotes mixing and distribution of the engine exhaust in said fan cavity.

10. The gas engine driven heat pump system of claim 1 wherein:

said heat pump system components are selectively operable in cooling or heating modes of operation and are connected with cooling or heating loads and a heat sink or source to selectively provide heat to or remove heat from the load; and the fan disposed in the first opening of said fan compartment is selectively operable to produce an air stream through said fan compartment in at least one direction.

11. The gas engine driven heat pump system of claim 1 wherein:

said perforated distribution pipe comprises at least two perforated distribution pipes connected to receive portions of the engine exhaust;

said at least one condensate drain opening includes a drain tube extending through said fan compartment drain opening, and said drain tube includes a condensate treatment device to chemically treat condensate; and said fan compartment drain opening is larger than said drain tube diameter to permit air to flow around said drain tube into said fan cavity; and said at least two perforated distribution pipes are disposed generally adjacent to that portion of said fan compartment which includes said fan compartment drain opening, said fan compartment drain opening positioned such that the air flow therethrough into said fan compartment to promote mixing and distribution of the engine exhaust in said fan cavity.

12. A gas engine driven heat pump system comprising heat pump system components to provide heating to indoor spaces during heating mode operation and to provide, said heat pump system including:

an outdoor fan compartment defining a fan cavity and having a plurality of openings;

a fan disposed in a first opening of said fan compartment to produce an air stream through said fan compartment in at least one direction;

an outdoor heat exchanger positioned in a second opening to convey an air stream into or out of said fan compartment;

at least a portion of the exhaust system of said gas engine positioned in said fan cavity to introduce engine exhaust thereinto and to provide exhaust gas dispersion and condensate removal, said portion of the exhaust system comprising:

at least one distribution pipe having at least one opening, said at least one distribution pipe disposed generally adjacent to a portion of said fan compartment; and at least one fan compartment drain opening in said portion of said fan compartment adjacent to said at least one distribution pipe, positioned to receive condensed exhaust gases and vapors draining from said distribution pipe, and sized to allow air flow into said fan compartment which promotes entrainment, mixing and distribution of engine exhaust in said fan compartment.

13. The gas engine driven heat pump system of claim 12 wherein said at least one distribution pipe includes:

at least one separate condensate drain opening in said distribution pipe positioned generally to drain condensed exhaust gases and vapors from said perforated distribution pipe through a respective fan compartment drain opening; and at least one separate exhaust opening.

14. The gas engine driven heat pump system of claim 13 wherein said at least one separate exhaust opening faces generally inward into said fan cavity.

15. The gas engine driven heat pump system of claim 13 wherein:

said distribution pipe comprises at least two distribution pipes connected to receive portions of the engine exhaust;

said at least two distribution pipes are disposed at angles relative to horizontal to urge condensate to flow towards said at least one condensate drain opening;

said at least one condensate drain opening includes a drain tube extending through said fan compartment drain opening, and said drain tube includes a condensate treatment device to chemically treat condensate; and said fan compartment drain opening is larger than said drain tube diameter to permit air to flow around said drain tube into said fan cavity.

16. The gas engine driven heat pump system of claim 15 wherein:

said heat pump system components are selectively operable in cooling or heating modes of operation and are connected with cooling or heating loads and a heat sink or source to selectively provide heat to or remove heat from the load; and the fan disposed in the first opening of said fan compartment is selectively operable to produce an air stream through said fan compartment in at least one direction.

17. The gas engine driven heat pump system of claim 16 wherein at least one section of said at least one distribution pipe comprises a perforated distribution pipe having a plurality of exhaust openings facing generally inward into said fan cavity.

18. A method for exhaust gas dispersion and condensate removal for gas engine driven heat pumps comprising the steps of:

providing a gas engine driven heat pump system having heat pump system components to provide heating to indoor spaces during heating mode operation, wherein said heat pump system includes an outdoor fan compartment defining a fan cavity and having a plurality of openings, a fan disposed in a first opening of said fan compartment to produce an air stream through said fan compartment in at least one direction, an outdoor heat exchanger positioned in a second opening to convey an air stream into or out of said fan compartment, and wherein said heat pump system further includes an exhaust system for said gas engine, at least a portion of which is positioned in said fan cavity;

distributing engine exhaust into said fan cavity through at least one distribution pipe comprising a portion of said exhaust system in said fan cavity;

mixing said engine exhaust with said air stream produced by said fan through said fan compartment;

providing at least one fan compartment drain opening in said fan compartment, and providing at least one condensate drain opening in said distribution pipe to drain said condensate through said respective fan compartment drain opening; and draining condensed exhaust gases and vapors from said exhaust system through said fan compartment drain opening.

19. The method of claim 18 wherein the step of distributing engine exhaust into said fan cavity is performed by distributing said engine exhaust through at least one perforated distribution pipe.

20. The method of claim 18 wherein:

the step of providing at least one condensate drain opening in said distribution pipe includes providing a drain tube extending from said condensate drain opening to drain said condensate through said respective fan compartment drain opening; and the step of draining condensed exhaust gases and vapors includes the step of chemically treating said condensed exhaust gases and vapors in said drain tube.

\* \* \* \* \*